Dec. 2, 1969 F. DERMOND 3,482,060

HEAD MOUNTING FOR MULTI-TRACK MAGNETIC RECORDER OR REPRODUCER

Filed Oct. 18, 1966 2 Sheets-Sheet 1

INVENTOR
F. DERMOND
BY Charles E. Graves
ATTORNEY

Dec. 2, 1969 F. DERMOND 3,482,060

HEAD MOUNTING FOR MULTI-TRACK MAGNETIC RECORDER OR REPRODUCER

Filed Oct. 18, 1966 2 Sheets-Sheet 2

United States Patent Office 3,482,060
Patented Dec. 2, 1969

3,482,060

HEAD MOUNTING FOR MULTI-TRACK MAGNETIC RECORDER OR REPRODUCER

Franklin Dermond, Middletown Township, Monmouth County, N.J., assignor to Bell Telephone Laboratories, Incorporated, Murray Hill and Berkeley Heights, N.J., a corporation of New York Filed Oct. 18, 1966, Ser. No. 587,588
Int. Cl. G11b *5/12*
U.S. Cl. 179—100.2 6 Claims

ABSTRACT OF THE DISCLOSURE

This disclosure describes head-mounting apparatus for magnetic drum recorder-reproducers. Several arms are pivotally mounted in alignment slots in a rack parallel to the recording drum access. Each arm is pivoted to a base through two movable tapered shafts whose centerline is perpendicular to the track and parallel to the drum axis. The shafts are each spring-loaded against ball bearings in the arms.

This invention relates to magnetic recorders and reproducers, and more particularly to a novel mounting for the magnetic heads suitable for continuously operating machines.

A persistent problem of current magnetic head mountings relates to the alignment of the magnetic head with the recording track beneath. For the highest quality of reproduction, the magnetic gap in a head must be set with proper head pressure against the magnetic track and retained in a position parallel to the track surface, perpendicular to the direction of track movement and coextensive with the track width. In addition, if the recorder is of the drum type, the plane of the magnetic gap must be tangent to the drum surface at the point of contact. On machines presently built, this alignment is set first at the factory, but because the heads sometimes become worn with use or damaged in handling they must be replaced. This requires under present practice an in situ alignment of the replacement head.

Head alignments done in the field are time-consuming, costly, and also less reliable than those that might be made at the factory where the equipment and circumstances usually are much better suited. These considerations are especially important for large multi-head machines, a prime example of which is a 96-track message storage unit for a telephone central office announcement system.

Accordingly, an object of the invention is to eliminate the need for aligning magnetic heads in the field.

Another object of the invention is to permit final alignment of individual magnetic drum heads at the factory before they are installed in a machine.

A further object of the invention is to facilitate field inspection of a magnetic drum surface or magnetic drum head without jeopardizing the head alignment.

These and other objects are achieved pursuant to the invention, broadly, by a head mounting comprising one or more head-supporting arms pivotally mounted in corresponding alignment slots in a rack parallel to the recording axis and fixed with respect thereto. Each arm is pivoted to a base through two tapered shafts which are movable with respect to each other only along a common centerline. The rack and base combined insure the shaft's centerline is aligned precisely perpendicular to the track and parallel to the drum axis.

In accordance with one aspect of the invention, the shafts are internally spring-loaded against each other to force their tapered extremities against ball or tapered roller bearings in the base. Once the shafts are placed in their bearings, the spring-loading is locked in and any looseness of the shafts in their bores is removed through set screws. Radial and axial play at the pivot point thus cannot occur.

Pursuant to another aspect of the invention, an adjustable torsion spring between the base and arm maintains a predetermined contact pressure between the head and the track. Further, each arm may be lifted up and placed in a catch to expose the surface or magnetic head gap for inspection. On return to the track the head reassumes the precise alignment given it at the factory.

One feature of the invention, accordingly, resides in a two-piece pivot shaft with internal loading, and tapered extremities and set screws for locking in the loading and removing looseness of the two-piece pivot shaft in its bore, whereby radial and axial play between the head gap and its track are eliminated.

Another feature of the invention involves the mounting of the head itself in an adjustable swivel at the end of a pivot arm.

These and other objects and features of the invention are further delineated in the description to follow of an embodiment thereof, employing by way of illustration a drum-type magnetic recorder.

Figure 1C:
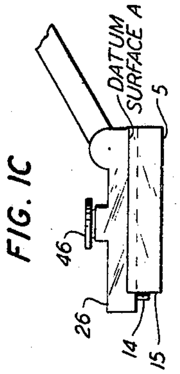
FIG. 1C is a partial side view showing a head mounted in a slot.
Figures 1A, 1B:
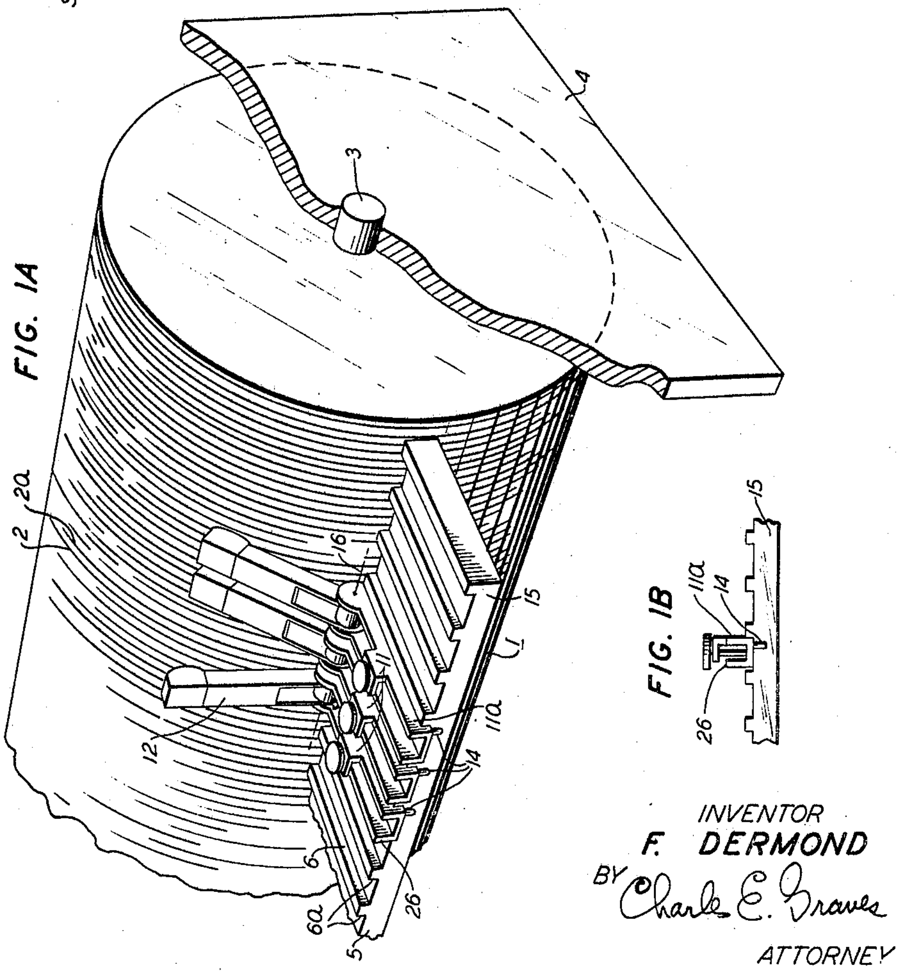
FIG. 1A is a schematic showing a drum and head mountings.
FIG. 1B is a partial front view showing a head mounted in a slot.

FIG. 1 shows schematically a magnetic drum 1 with a plurality of tracks 2 and a central shaft 3, mounted in a frame 4 which is integral with the over-all casing of an item of recording apparatus. The casing, motor and other parts of the recorder are not essential to an understanding of the invention and are omitted. Rigidly attached to frame 4 is a rack 5, with a plurality of parallel alignment slots 6. The datum side **6*a* of each slot 6 is precisely positioned with respect to—e.g. parallel to—the corresponding datum edge 2*a* of track 2 by some suitable means such as precise machining of the several parts and then assembled to a precise dimension using shims whenever necessary. When so assembled, the plane of the floor of each slot 6 is parallel to the centerline of shaft 3, and each track 2 is precisely positioned with respect to its corresponding slot 6**.

In each slot 6 is placed a head-mounting assembly 10, hereinafter termed assembly 10, which is made up of a base 11, a pivoted arm 12 and a magnetic head 13 having a pole-piece 13$a$ with a gap 8. The datum side 11$a$ of base 11 locates against the datum side 6$a$ of a slot 6, with a suitable clearance between the base and the opposite side of the slot. At the far end of each base 11 is a locating pin 14 which abuts a machined edge 15 of rack 5. The plane of edge 15 is precisely parallel to shaft 3 and precisely perpendicular to the datum side 6$a$ of each slot 6. Additionally, the distance between pin 14 and the pivot axis 16 of arm 12 is precisely controlled. Hence, in accordance with the invention, when a base 11 is mounted as described in a slot 6, the pivot axis 16 falls in a line that is parallel to the axis of shaft 3; and the datum side 11$a$ of base 11 is precisely positioned with respect to the datum edge 2$a$ of track 2.

Figure 3:
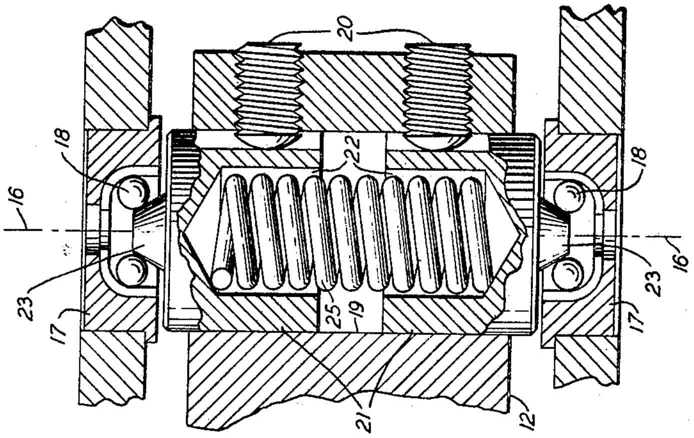
FIG. 3 is a top sectional view of the mounting showing the arm pivot.
Figures 2, 4:
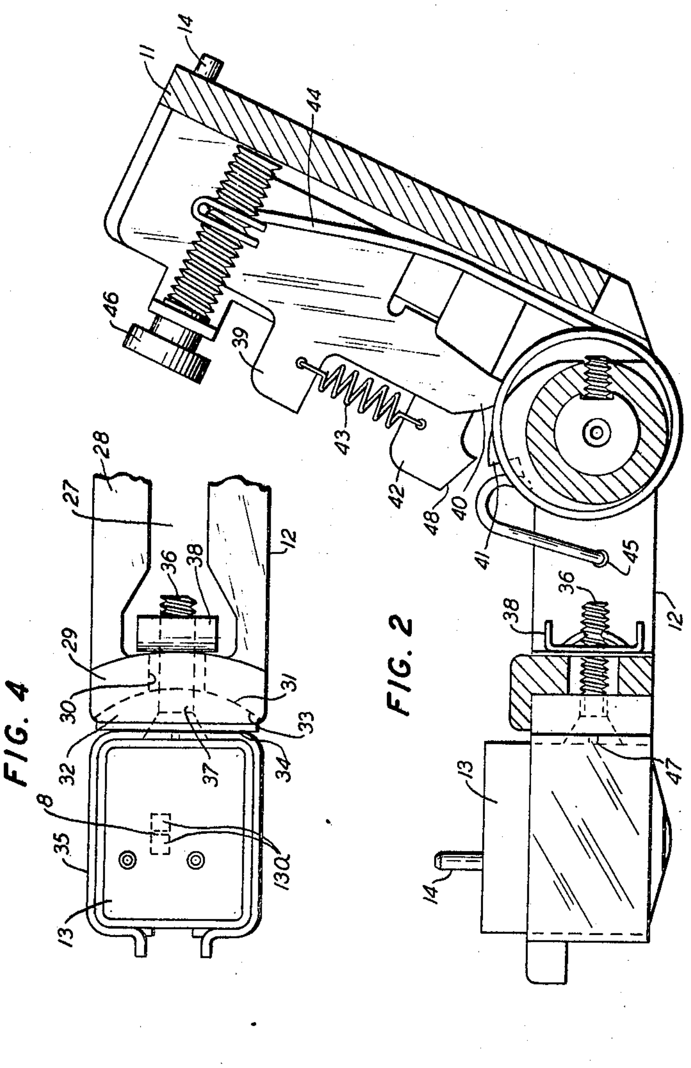
FIG. 2 is a side view in partial section showing a head and mounting.
FIG. 4 is a top view showing the head mounted on the arm.

FIGS. 2 through 4 show the working details of assembly 10. The base 11 includes at its pivot end a pair of bushings 17 and a pair of bearings 18 therein which advantageously are of the ball-bearing type. The arm 12 includes at its pivot end a bore 19 and a pair of set screws 20. Mounted within bore 19 are two cups 21 in a slight clearance fit, each having an interior space 22. The outer sides of cups 21 each include a tapered shaft 23, the axis 16 of which is coincident with the centerline of bore 19. Shafts 23 are forced into contact with bearings 18 by action of loading spring 25. Set screws 20 thereafter are activated to lock in the desired loading and nullify the clearance between cups 21 and bore 19. Hence, no play occurs between the base 11 and arm 12, even though they are pivotally mounted with respect to each other.

Arm 12 swivelably supports head 13 at its outer end. Arm 12 may be a channel or some other shape with an interior void at its outer end. Pictured in FIG. 4 is such a void, designated 27, and defined by side walls 28 and end piece 29 the inner side of which is generally convex. End piece 29 comprises a large passage 30 at the outer side of which is a concave surface 31. A segment 32 includes a convex inner surface 33 that mates with surface 31, and a flat outer surface 34 that contacts a box-like holder 35 for head 13. A stud 36 attaches loosely to holder 35 and passes loosely through a passage 37 in segment 32 to protrude through passage 30 where a spring-type nut 38 engages it. Before the head 13 is assembled in holder 35, stud 36 is tightened in nut 38 by means of slot 47, just enough to remove looseness of the parts.

Thus, head 13 can be rotated about an axis defined as that of study 36. Or, head 13 can be swiveled by moving stud 36 through relative movement of concave surface 31 and convex surface 33. Any desired adjustment of head 13 can be fixed thereafter by suitably cementing together arm 12, head 13, end piece 29, segment 32, holder 35, stud 36, and nut 38. Other arrangements for these same motions can readily be envisioned by persons versed in this art, the object in each case being to permit alignment of gap 8 parallel to the surface of its corresponding track, and perpendicular to the direction of motion of said track.

As seen in FIG. 2, base 11 includes a catch mechanism for latching arm 12 in an upright position. A plate 39 movable along an inside wall of base 11 includes a latch 40 that engages a tooth 41 mounted rigidly upon the outer surface of arm 12. A fixed plate 42 mounts a spring 43 that fastens to plate 39, forcing latch 40 into engagement with tooth 41 when arm 12 is raised sufficiently. If arm 12 is raised beyond the catch, surface 48 of plate 42 will stop against arm 12 to prevent overstressing spring 44 or damage to the electrical connections to head 13.

Additionally, arm 12 is spring-loaded to provide pressure between head 13 and drum 1 by a spring 44 which loops through void 27, around outer end of arm 12 and engages arm 12 at a point 45. At its other end is an adjustment screw 46 in base 11. Screw 46 varies the torsion in spring 44 and adjusts the contact pressure of head 13 upon its track 2.

Figure 6:
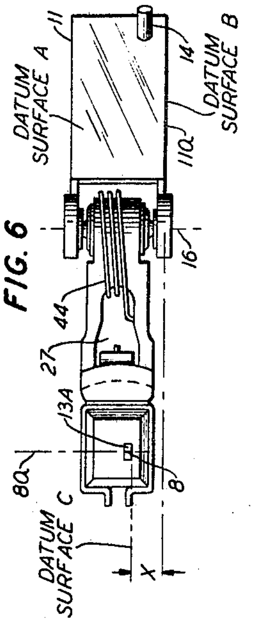
FIG. 6 is a bottom view of the head mounted on the arm.
Figure 5:
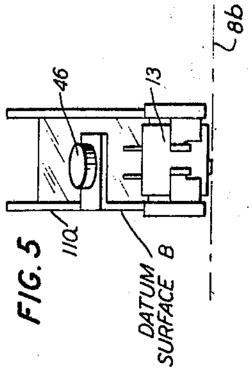
FIG. 5 is an end view showing the head mounted on the arm.

FIG. 6 depicts certain datum surfaces provided on assembly 10, pursuant to the invention, which enable head 13 to be precisely aligned at the factory to insure the aforementioned alignment with track 2 when later installed in the field. Datum surface A, as shown also in FIG. 1C, is parallel to the centerline 8$a$ of gap 8 and to pivot axis 16, each as measured in all planes. Datum surface B is perpendicular to the bottom plane 8$b$ of gap 8 as shown in FIG. 5; and in effect is datum side 11$a$ of base 11. Datum surface C shown in FIG. 6 is a reference surface of head pole piece 13$a$ and is precisely located—e.g. parallel—with respect to datum surface B. Accordingly, datum surface C is precisely aligned with the corresponding datum edge 2$a$ of track 2 when a head-mounting assembly 10 is placed in a slot 6 as aforementioned.

In brief, factory adjustment of each head 13 to insure alignment with any track 2 on any machine proceeds in the following fashion. The magnetic head assembly is mounted in a suitable measuring device such as a toolmaker's microscope, and in the same manner as in actual use. With stud 37 and nut 38 sufficiently tight to firmly hold head 13 and holder 35 but still permit of adjustment, head 13 is rotated through relative movement of concave surface 31 and convex surface 33, until the centerline of gap is parallel to the datum surface, designated A, shown in FIG. 6. Head 13 is then rotated about the axis of stud 36 until the bottom plane of gap 8 is perpendicular to datum surface B. With set screws 20 loosened, arm 12 is moved along cups 21 until the datum side C of the pole-piece portion of head 13 is located the proper distance, designated X in FIG. 6, from datum surface B. Set screws 20 are then tightened. After the above adjustments have been made a suitable cement is applied to the parts as aforementioned to permanently secure them and maintain the above adjustment. Also, with the head assembly mounted as in actual use, spring 44 is adjusted so that the force exerted on arm 12 will provide a force at the gap 8 which will ensure the proper pressure between the head and drum when mounted in a slot 6 on the machine.

It is obvious that the inventive concepts, herein described with respect to a multi-track magnetic drum device, are equally applicable to machines with a single track, to endless loop machines and others.

What is claimed is:

1. In combination: a magnetic drum including a plurality of parallel magnetic tracks, a rack comprising an edge parallel to the axis of the member and a plurality of parallel slots perpendicular to said edge, means for positioning said rack so that said slots align with respective ones of said tracks, a plurality of magnetic heads each having a magnetic gap, and head mounting means comprising a base fitted in each slot, bearing means at one end of each said base, a pivot arm including means at a first end for positioning said gap with respect to said track, said arm second end comprising means for lateral positioning of said gap to said track at second end, and a pair of tapered shafts at said arm second end comprising a pair of opposed chambered cups inwardly of each said shaft, said cups being mounted in said arm end in a slight clearance fit therewith, resilient means mounted between said chambers for forcing said shafts into engagement with said bearing means, means for fixing the distance between the rotating drum surface and said rack edge, and means for fixing the distance between said edge and said bearing means.

2. The combination of claim 1, further comprising means for locking in the shaft loading occasioned by said resilient means and for locking said cups to said arm end.

3. The combination of claim 2, wherein said head mounting means further comprises means for rotating said head with respect to said arm thereby to achieve a parallel relation between said gap and the surface of said track, means for skewing said head with respect to said arm thereby to align said gap in a direction perpendicular to the direction of movement of said track, and means for fixing said rotational adjustment and said skewing adjustment.

4. The combination of claim 3, further including means for latching each said arm in a cocked position with respect to said base.

5. The combination of claim 4, further including means for applying a contact force between each said head and said track.

6. The combination of claim 5, further including means for adjusting the magnitude of said contact force.

References Cited

UNITED STATES PATENTS

| | | | |
|---|---|---|---|
| 2,769,037 | 10/1956 | Dank et al. | 179—100.2 |
| 2,880,280 | 3/1959 | Gernert et al. | 179—100.2 |

BERNARD KONICK, Primary Examiner

J. R. GOUDEAU, Assistant Examiner

U.S. Cl. X.R.

340—174.1